United States Patent
White et al.

(10) Patent No.: US 11,194,613 B2
(45) Date of Patent: Dec. 7, 2021

(54) METHODS AND DEVICES FOR VIRTUALIZING A DEVICE MANAGEMENT CLIENT IN A MULTI-ACCESS SERVER SEPARATE FROM A DEVICE

(71) Applicant: Verizon Patent and Licensing Inc., Arlington, VA (US)

(72) Inventors: Brian Matthew White, Port Murray, NJ (US); Ning Zhang, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

(21) Appl. No.: 16/543,281

(22) Filed: Aug. 16, 2019

(65) Prior Publication Data

US 2021/0049032 A1 Feb. 18, 2021

(51) Int. Cl.
*G06F 9/455* (2018.01)
*H04L 29/08* (2006.01)
*H04L 29/06* (2006.01)

(52) U.S. Cl.
CPC .......... *G06F 9/45558* (2013.01); *H04L 67/12* (2013.01); *G06F 2009/45595* (2013.01); *H04L 67/42* (2013.01)

(58) Field of Classification Search
CPC ....... G06F 2009/45562; G06F 9/45533; G06F 9/45558; G06F 67/42; G06F 2009/45595; G06F 67/12
See application file for complete search history.

(56) References Cited

U.S. PATENT DOCUMENTS

| | | |
|---|---|---|
| 2019/0109714 A1 | 4/2019 | Clark et al. |
| 2019/0349426 A1* | 11/2019 | Smith ................. G06F 16/1824 |
| 2020/0267518 A1* | 8/2020 | Sabella ................. H04W 48/16 |
| 2020/0326989 A1* | 10/2020 | Li .......................... G06F 9/4843 |
| 2020/0403935 A1* | 12/2020 | Yerli ....................... H04L 67/10 |
| 2021/0153019 A1* | 5/2021 | Bachmutsky ........... H04L 67/10 |

* cited by examiner

*Primary Examiner* — Frantz B Jean

(57) ABSTRACT

An exemplary client virtualization system implemented by a multi-access server receives a service request from an Internet of Things ("IoT") device that is separate from and communicatively coupled to the multi-access server. In response to the service request, the client virtualization system instantiates a virtualized device management client configured to serve the IoT device and that is hosted on the multi-access server. The client virtualization system receives a device management message that is for the IoT device and that is from a centralized device management server. The client virtualization system then delivers the device management message to the IoT device. Corresponding methods and systems are also disclosed.

20 Claims, 10 Drawing Sheets

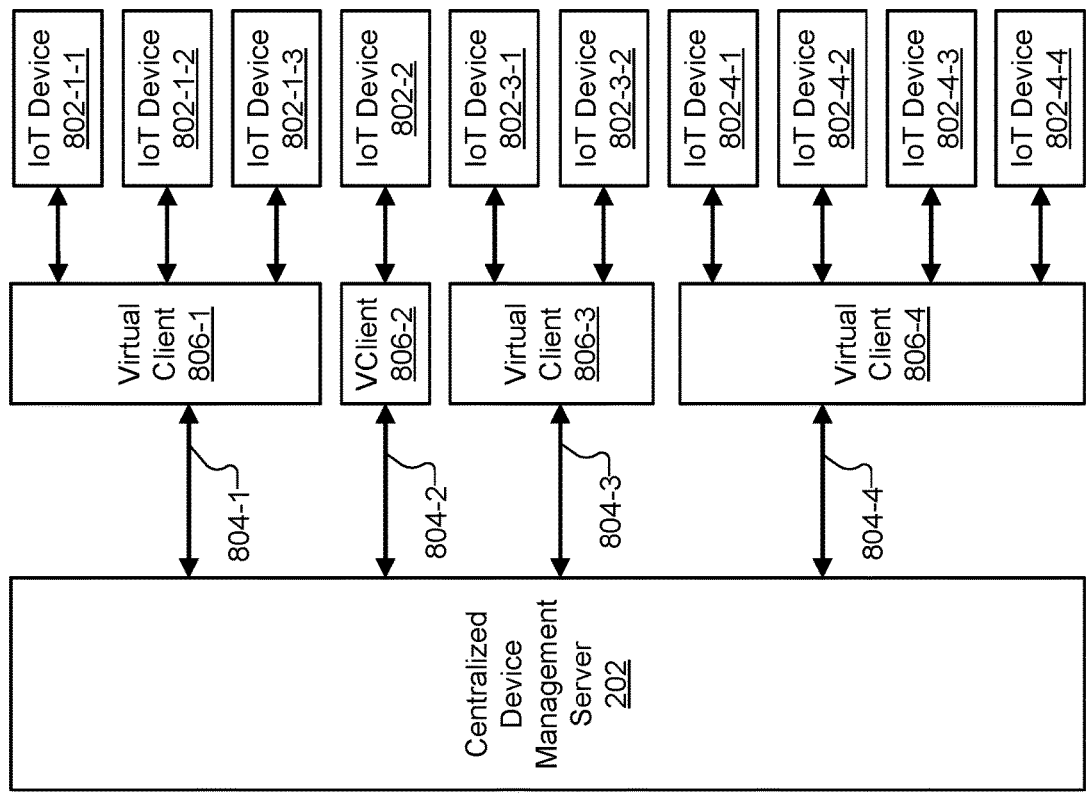
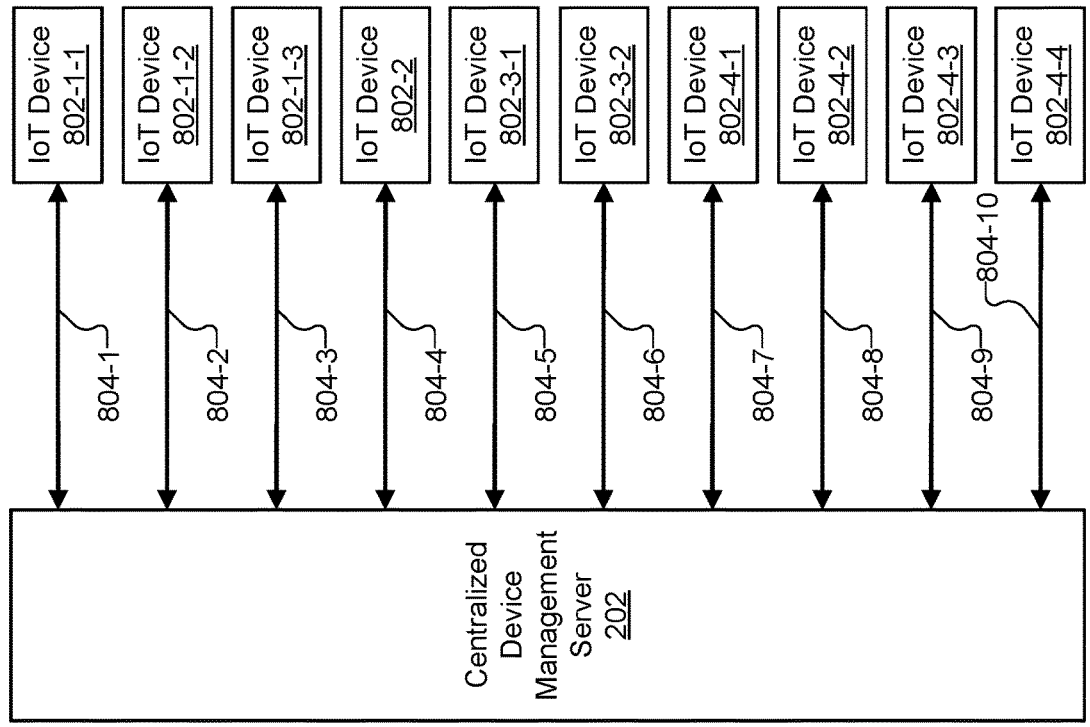

METHODS AND DEVICES FOR VIRTUALIZING A DEVICE MANAGEMENT CLIENT IN A MULTI-ACCESS SERVER SEPARATE FROM A DEVICE

BACKGROUND INFORMATION

The Internet of Things refers to the growth of the Internet in recent years to incorporate and connect various types of physical, Internet-of-Things devices ("IoT devices"). For example, IoT devices may include everyday objects (e.g., home appliances, lighting fixtures, thermostats, smart vehicles, security systems and cameras, cargo tracking, etc.), as well as special-purpose devices such as sensor devices for monitoring and/or controlling industrial processes, scientific experiments, public safety, or the like.

In several respects, certain IoT devices may be fundamentally different from conventional, general-purpose systems and devices interconnected by way of the Internet. For example, many IoT devices have highly specialized purposes, and may include relatively minimal hardware, software (firmware), battery, and other resources to efficiently perform only these specialized purposes. Additionally, because of the specialized nature of such IoT devices, a relatively large number of identical or similar IoT devices may be deployed together to cooperatively fulfill a certain role in a particular use case. As a result of these and other differences, various challenges may arise for remotely monitoring, controlling, and/or otherwise managing IoT devices. There remains room for improvement in addressing many of these challenges.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8A illustrates exemplary aspects of a localized client management scheme for managing IoT devices according to embodiments described herein.

FIG. 8B illustrates exemplary aspects of a virtualized client management scheme for managing IoT devices according to embodiments described herein.

DETAILED DESCRIPTION OF PREFERRED EMBODIMENTS

Figure 1:
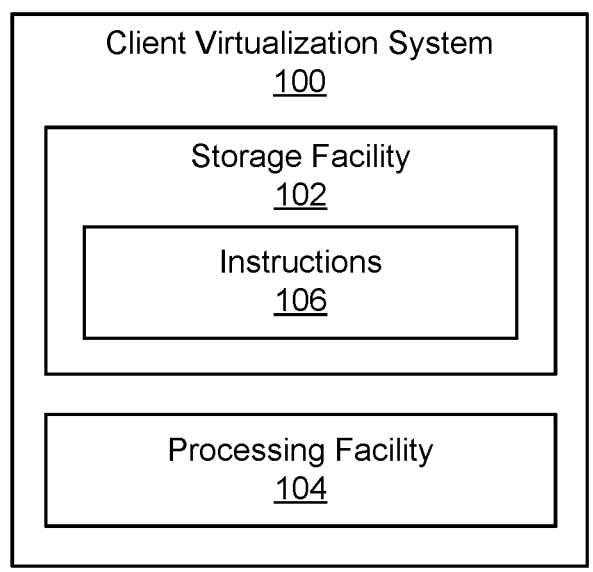
FIG. 1 illustrates an exemplary client virtualization system for virtualizing a device management client in a multi-access server separate from a device according to embodiments described herein.

Methods and systems for virtualizing a device management client in a multi-access server separate from a device are described herein. For example, in one embodiment, a client virtualization system may be implemented by (e.g., hosted by, implemented by resources of, etc.) a multi-access server such as a Multi-access Edge Compute ("MEC") server, a multi-access cloud server, or the like. In operation, such a client virtualization system may receive a service request from an Internet of Things ("IoT") device that is separate from and communicatively coupled to the multi-access server. For example, the IoT device may be one of many IoT devices (e.g., similar or equivalent IoT devices configured to cooperatively perform a same function, dissimilar or unique IoT devices configured to perform different functions, etc.) that are communicatively coupled to the multi-access server.

In response to the service request, the client virtualization system may instantiate a virtualized device management client to serve the IoT device. This virtualized device management client may be hosted on the multi-access server and may serve the IoT device by way of communications between the multi-access server and the IoT device.

The client virtualization system may receive a device management message from a centralized device management server. The client virtualization system may be transmitted by the centralized device management server for the IoT device. For instance, the device management message may be intended for the IoT device, transmitted for the benefit of the IoT device, addressed to the IoT device, or the like. Accordingly, the client virtualization system may deliver the device management message to the IoT device. However, as will be described in more detail below, the device management message may be pre-processed by the client virtualization system prior to delivery, and the delivery of the (pre-processed) device management message may be performed by way of a device-oriented protocol for communications between the IoT device and the virtualized device management client from which may arise various advantages and benefits.

Advantages and benefits of the methods and systems described herein are advantageous and/or beneficial when compared to conventional configurations in which a centralized device management server communicates directly with localized device management clients executing on IoT devices themselves. In such configurations, which will be illustrated and described in more detail below, various challenges may arise that have previously gone unaddressed or have not been addressed in optimal, efficient, and/or scalable ways. Each of these challenges may be addressed in more optimal, efficient, and/or scalable ways by the methods and systems described herein, as will be made apparent throughout the following description.

For example, a first challenge relates to computing resource limitations of IoT devices. Because IoT devices are commonly implemented as small, special-purpose devices configured to be used in applications employing large numbers of such devices, it may be an important design goal to keep the device size small and the deployed resources in each IoT device modest and efficient (e.g., just enough resources to perform the special purpose functions for which the IoT device is designed). Methods and systems described herein may outsource some or all of the processing conventionally performed by a localized device management client to a multi-access server that may include many more plentiful and powerful computing resources than any individual IoT device. Accordingly, by removing the need for a significant amount of processing to be performed locally on the IoT devices themselves, methods and systems described herein may help address this challenge of limited computing resources, allowing IoT devices to increase battery life, to function with fewer computing resources, and to use limited resources more efficiently.

As another example, a second challenge relates to communication issues arising from infrequent IoT device availability. Specifically, due to strict battery constraints, it is common for many IoT devices to spend most of the time in a power-saving mode (e.g., a sleep mode in which the IoT device is powered-down and turned off, a low-power mode in which communications are limited or unavailable, etc.) and to exchange communications at sporadic times that can be difficult to predict and work around. For example, a particular IoT device may be configured to only leave the power-saving mode to engage in communications ("wake up") once per hour, once per day, or even less often. While this behavior may help IoT devices conserve limited battery life, it may be difficult for a centralized device management server to effectively manage such devices because data transmission to the devices may be highly unreliable as most device management messages are ignored (unless the IoT device happens to be powered on when a particular device management message is transmitted).

Methods and systems described herein may address such communication challenges by allowing for the device management clients of IoT devices to be hosted on multi-access servers that are always on and available to receive and respond to device management messages. By leveraging virtualized device management clients executing on such multi-access servers, methods and systems described herein may provide a way for centralized device management servers to more efficiently communicate with IoT devices and for IoT devices to deal with device management messages according to a device-oriented protocol that is convenient for the device (e.g., configured to work around when the IoT devices are fully powered on and responsive, etc.).

As yet another example, a third challenge relates to original equipment manufacturer ("OEM") compliance testing issues that must be performed in order for IoT devices manufactured by OEM entities to function properly on a particular network and/or within a particular configuration. Conventionally, it has been a major effort for OEM entities to implement localized device management clients for the IoT devices they manufacture, and to test that these device management clients meet various requirements and parameters defined for the centralized device management server and the communication network between the centralized device management server and the IoT devices. By adding a virtualized device management client between a centralized device management server and a localized device management client and/or by replacing a localized device management client with a virtualized device management client hosted on a multi-access server, methods and systems described herein may significantly reduce this compliance burden on the OEM entities. For example, the virtualized device management client may be managed by a network provider rather than by the OEM themselves to ensure that relevant requirements are complied with, the virtualized device management client may be tested for compliance itself (rather than each IoT device served by a virtualized device management client needing to be tested for compliance), and so forth.

Additionally, as yet another example, a fourth challenge relates to network overloading induced by a large number of failed communications and/or extraneous pings conventionally necessary to determine when IoT devices are powered on and in a mode in which they are ready to communicate. Such messaging may be inconvenient and inefficient for configurations including a relatively small number of IoT devices, and can become catastrophically complex for configurations including large numbers of IoT devices. By providing virtualized device management clients that are always ready to accept and respond to communications from a centralized device management server, the methods and systems described herein drastically reduce the number of failed communications and/or extraneous pings that occur, while not necessarily requiring any change in localized device management clients executing locally on IoT devices. As a result, network traffic is significantly reduced and networks may be significantly more scalable to host very large numbers of IoT devices.

Along with more optimally and efficiently addressing all the challenges described above, methods and systems described herein may be beneficial in the sense that they do not require any change to the functionality of centralized device management servers configured to manage IoT devices. Moreover, while some additional advantages may arise from altering the functionality of IoT devices themselves (e.g., removing the localized device management clients to conserve resources of the IoT devices), legacy IoT devices may similarly benefit significantly from methods and systems described herein without being altered. This is because virtualized device management clients may be configured to operate between a centralized device management server and one or more IoT devices in a manner that can be configured to be transparent to both the centralized device management server and to the IoT devices, but that significantly facilitates the communications therebetween.

As will be described in more detail below, all of these benefits may be provided by client virtualization systems implemented by any type of multi-access server (e.g., including cloud-based multi-access servers). Additionally, as will be made apparent in the description below, additional benefits and advantages may further be provided by client virtualization systems implemented by specific types of multi-access servers such as MEC servers. These benefits and advantages may arise, for example, from the ultra-low latency, reduced backhaul, reduced network traffic, etc., that MEC servers may be configured to provide.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary client virtualization system 100 ("system 100") for virtualizing a device management client in a multi-access server separate from a device. For example, as will be described in more detail below, system 100 will be understood to be implemented by a multi-access server that is separate from and communicatively coupled with one or more IoT devices (not explicitly shown in FIG. 1).

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices (e.g., multiple computing devices or processor cores that are part of a single multi-access server, etc.) and/or multiple locations as may serve a particular implementation. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with virtualizing a device management client in a multi-access server separate from a device. To this end, processing facility 104 may be configured to receive a service request from an IoT device that is separate from and communicatively coupled to the multi-access server implementing system 100. In response to the service request, processing facility 104 may instantiate a virtualized device management client to serve the IoT device. For instance, rather than being hosted on computing resources of the IoT device such as a conventional device management client (or "localized device management client") would be, the virtualized device management client may be hosted on the multi-access server (i.e., by executing on computing resources of the multi-access server such as one or more processors, memories, storage facilities, and so forth that are integrated with the multi-access server).

In this configuration, processing facility 104 may receive a device management message from a centralized device management server. For example, the device management message may be transmitted by the centralized device management server and may be for the IoT device (e.g., intended for the IoT device, addressed to the IoT device, etc.). Accordingly, processing facility 104 may deliver the device management message to the IoT device rather than the centralized device management server itself delivering the message to the IoT device. Various benefits and advantages such as those described above may result from system 100 receiving and delivering the device management message in this way. For example, processing facility 104 may deliver the device management message by way of a device-oriented protocol for communications between the IoT device and the virtualized device management client. As will be described in more detail below, such a device-oriented protocol may be configured to make communications with the IoT device efficient, effective, and convenient for the IoT device. For example, rather than the virtualized device management client executed by processing facility 104 having to continuously ping the IoT device until the IoT device is awake and ready to communicate, the device-oriented protocol may operate in a manner that puts the IoT device in control of when communications occur (i.e., to perform communications on the preferred schedule of the IoT device rather than the preferred schedule of the centralized device management server).

In some examples, system 100 may be configured to operate in real time so as to provide, receive, process, and/or use the data described herein (e.g., service requests, device management messages, responses to device management messages, etc.) immediately as the data is generated, updated, changed, or otherwise becomes available. As a result, system 100 may perform the operations described herein based on relevant, real-time data so as to allow IoT devices to respond to management and control from a centralized device management server just as responsively as if the device management client were completely localized to the IoT devices themselves. As used herein, operations may be performed in "real time" when they are performed immediately and without undue delay. In some examples, real-time data processing operations may be performed in relation to data that is highly dynamic and time sensitive (i.e., data that becomes irrelevant after a very short time). As such, real-time operations may perform operations described herein immediately, with low latency, and based on data that is relevant and up to date.

Figure 2:
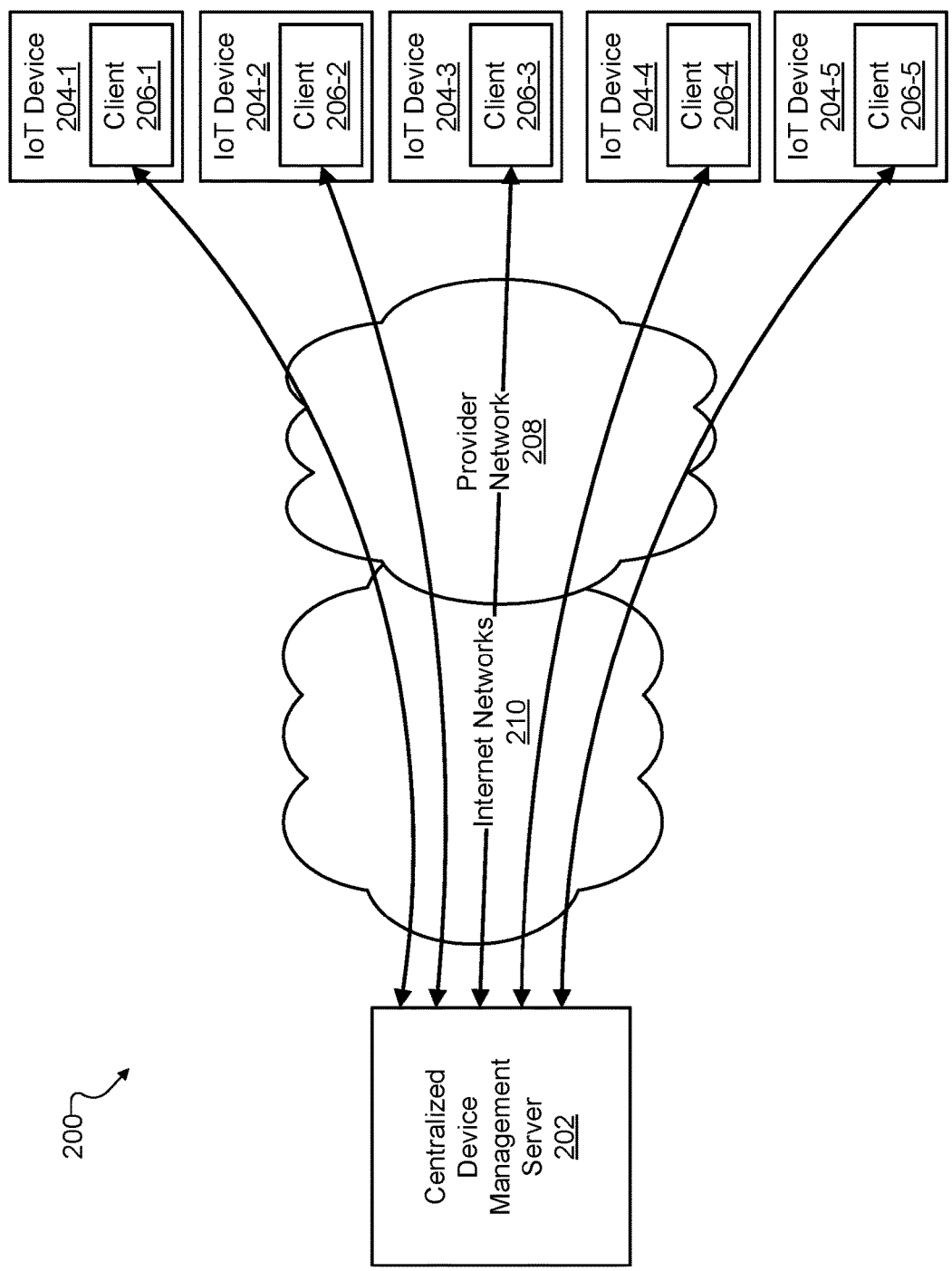
FIG. 2 illustrates an exemplary configuration by way of which a centralized device management server manages a plurality of Internet of Things ("IoT") devices according to embodiments described herein.

FIG. 2 illustrates an exemplary configuration 200 by way of which a centralized device management server 202 manages a plurality of IoT devices 204 (e.g., IoT devices 204-1 through 204-5, as well as additional IoT devices not explicitly shown). Configuration 200 represents a conventional configuration in which a centralized device management server communicates directly with localized device management clients executing locally on each IoT device, and in which no virtualized device management client is utilized. Specifically, as shown, centralized device management server 202 ("management server 202") communicates with respective localized device management clients 206 (e.g., localized device management clients 206-1 through 206-5 for IoT devices 204-1 through 204-5, respectively) directly by way of a provider network 208 and one or more other networks 210 ("Internet networks 210") external to provider network 208 and, in some examples, associated with the Internet or the like. Each of the elements shown in configuration 200 will now be described in more detail.

Management server 202 may represent any suitable management system configured to control, track, provide messages (e.g., instructions, commands, etc.) and other data to, receive messages (e.g. status updates, sensor readings, acknowledgments, etc.) and other data from, and/or otherwise manage IoT devices such as IoT devices 204. In some examples, management server 202 may be controlled and managed by an owner of IoT devices 204. For instance, if IoT devices 204 are sensor devices associated with a particular process (e.g., an industrial process, a public service, a scientific experiment, etc.), management server 202 may be managed and controlled by and/or otherwise associated with an entity overseeing the particular process. As another example, if IoT devices 204 are associated with appliances and/or other objects controlled by a consumer, management server 202 may be managed and controlled by and/or otherwise associated with an entity that provides and services the appliances for the consumer. In any case, management server 202 may be implemented by a centralized set of computing resources (e.g., one or more server or other computers) that is configured to provide service for a potentially large number of IoT devices (e.g., all of IoT devices 204). Accordingly, as illustrated by the arrows, management server 202 may exchange data (e.g., device management messages, device management message responses, etc.) with each IoT device 204 individually by way of provider network 208 and/or internet networks 210.

IoT devices 204 may each represent an individual IoT device configured to perform a particular function. In some examples, IoT devices 204 may be implemented by multi-purpose or general-purpose devices such as computer or enterprise mobile devices (e.g., smartphones, tablet computers, laptop computers, etc.). In other examples, however, IoT devices 204 may be implemented by special-purpose devices having much more modest computing resources and configured to perform much more limited and specialized functionality. For instance, a large number of IoT devices 204 each configured with temperature and pressure sensors may be deployed in and around a nuclear reactor to monitor the nuclear reactor and help ensure efficiency and safety of the reactor. In this example, each IoT device 204 may be relatively small and simple so as to be able to perform the requisite sensing and reporting needed for the nuclear reactor application, but without being configured to perform more complex and general-purpose computing tasks such as running a general-purpose mobile operating system, running mobile applications, providing web browsing capabilities, or the like. In other examples, similar IoT devices 204 of varying levels of complexity and sophistication may be employed to monitor other processes such as ambient temperature in a home or office, strain and temperature along a train track, security for a home or place of business, or any of various other processes and/or applications as may serve a particular implementation.

While in certain examples described herein IoT devices 204 are special-purpose (and therefore relatively resource-limited devices), it will be understood that the principles described herein may also apply to certain general-purpose IoT devices as well. For example, while mobile operating systems of mobile devices (e.g., smartphones, tablets, laptops, etc.) are generally configured to execute on the devices locally, virtualized mobile operating systems for such devices may be virtualized and hosted by multi-access servers in the same manner as described herein for virtualized device management clients to thereby achieve similar or analogous benefits and advantages.

Device management clients 206 may be implemented as any suitable client software for managing devices such as IoT devices 204. For instance, device management clients 206 may be implemented as Light Weight Machine-to-Machine ("LWM2M") clients, Open Mobile Alliance-Device Management (e.g., OMA-DM ver. 1.2, OMA-DM ver. 2.0, etc.) clients, Message Queueing Telemetry Transport ("MQTT") clients, or any other device management clients as may serve a particular implementation. As shown in configuration 200, device management clients 206 represent localized device management clients configured to execute locally on IoT devices 204. Such localized device management clients contrast with virtualized device management clients that will be illustrated and described in more detail below, and which will be understood to execute on computing resources other than those of the IoT devices 204 served by the virtualized device management clients.

Regardless of where a particular device management client is hosted, the device management client may embody software that is configured to communicate with a device management server (e.g., management server 202, etc.) to facilitate management of the IoT device 204 served by the device management client. For example, device management client 206-1 may receive messages (e.g., instructions, firmware updates, status requests, etc.), respond to requests (e.g., providing requested sensor data, etc.), generate messages (e.g., providing error codes, diagnostics, etc.), and or otherwise facilitate device management directed by management server 202 with respect to IoT device 204-1. Similarly, device management client 206-2 may perform similar functionality with respect to IoT device 204-2, device management client 206-3 may perform similar functionality with respect to IoT device 204-3, and so forth.

Provider network 208 may provide, for each IoT device 204, communication access to management server 202, to other IoT devices 204, and/or to other systems and/or devices as may serve a particular implementation. As shown, for example, provider network 208 may provide access, for each IoT device 204, to Internet networks 210 whereby data may be communicated with management server 202.

Provider network 208 may be implemented by a provider-specific wired or wireless communications network (e.g., a cellular network used for mobile phone and data communications, a 5G network or network of another suitable technology generation, a cable or satellite carrier network, a mobile telephone network, etc.), and may be operated and/or managed by a provider entity such as a mobile network operator (e.g., a wireless service provider, a wireless carrier, a cellular company, etc.). The provider of provider network 208 may own or control all of the elements necessary to provide and deliver communications services for IoT devices 204 and/or other device (e.g., other IoT devices, mobile devices, etc.), including radio spectrum allocation, wireless network infrastructure, back haul infrastructure, customer care, provisioning of devices, network repair for provider network 208, and so forth.

Internet networks 210 may include any interconnected network infrastructure that is outside of provider network 208 and outside of the control of the provider. For example, Internet networks 210 may include one or more of the Internet, a wide area network, a content delivery network, and/or any other suitable network or networks managed by any third parties outside of the control of the provider of provider network 208.

Both provider network 208 and Internet networks 210 will be understood to provide data delivery between server-side systems such as management server 202 and client-side systems and devices such as IoT devices 204. To this end, provider network 208 and Internet 210 may implement or employ any suitable communication technologies, devices, media, protocols, or the like as may serve a particular implementation.

As has been described, various benefits and advantages may result when localized device management clients such as device management clients 206 are either replaced or supplemented by virtualized device management clients executing on multi-access servers separate from IoT devices 204. As used herein, a "multi-access server" may refer to any computing device configured to perform computing tasks for a plurality of client systems or devices. Multi-access servers may be configured with sufficient computing power (e.g., including substantial memory resources, substantial storage resources, parallel central processing units ("CPUs"), parallel graphics processing units ("GPUs"), etc.) to implement a distributed computing configuration wherein devices and/ or systems (e.g., including, for example, IoT devices 204)

can offload certain computing tasks to be performed by the powerful resources of the multi-access server.

Different types of multi-access servers may be differentiated herein based on which network or networks the multi-access servers are associated with. For example, one type of multi-access server may be a cloud-based multi-access server (a "cloud server") that is implemented external to provider network 208 by a party other than the provider of provider network 208 (e.g., so as to be connected to IoT devices 204 by way of both provider network 208 and Internet networks 210). In contrast, another type of multi-access server may be a MEC-based multi-access server (a "MEC server") that is implemented by components of provider network 208 itself and is thus managed by the provider of provider network 208 (e.g., so as to be connected to IoT devices 204 with a lower latency because only elements of provider network 208, and not elements of Internet networks 210, are used to connect IoT devices 204 to the MEC server). Other types of multi-access servers that do not precisely implement cloud servers or MEC servers as described herein may also be used in certain implementations.

Figure 3:
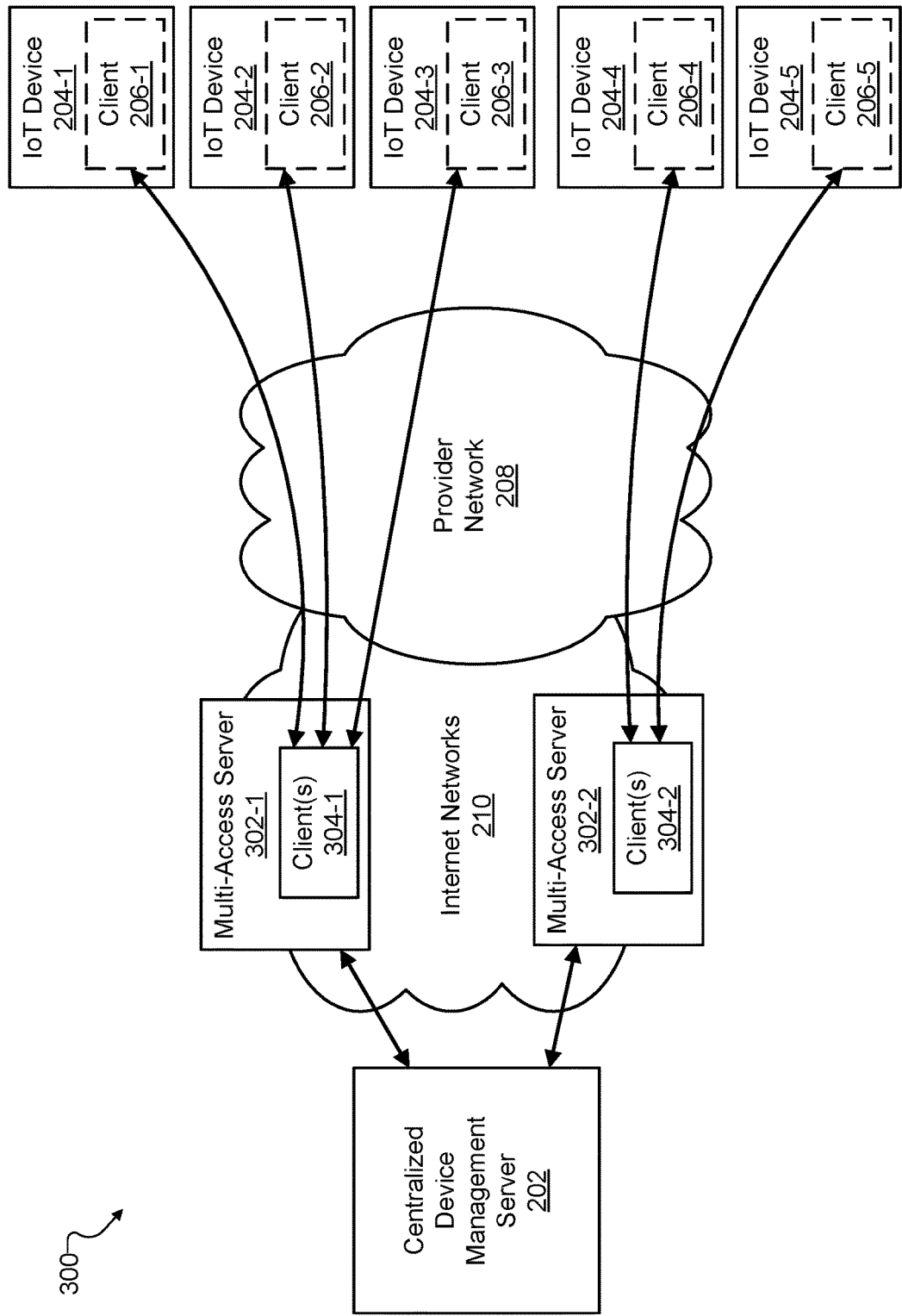
FIG. 3 illustrates an exemplary configuration in which the client virtualization system of FIG. 1 is implemented by cloud-based multi-access servers according to embodiments described herein.
Figure 4:
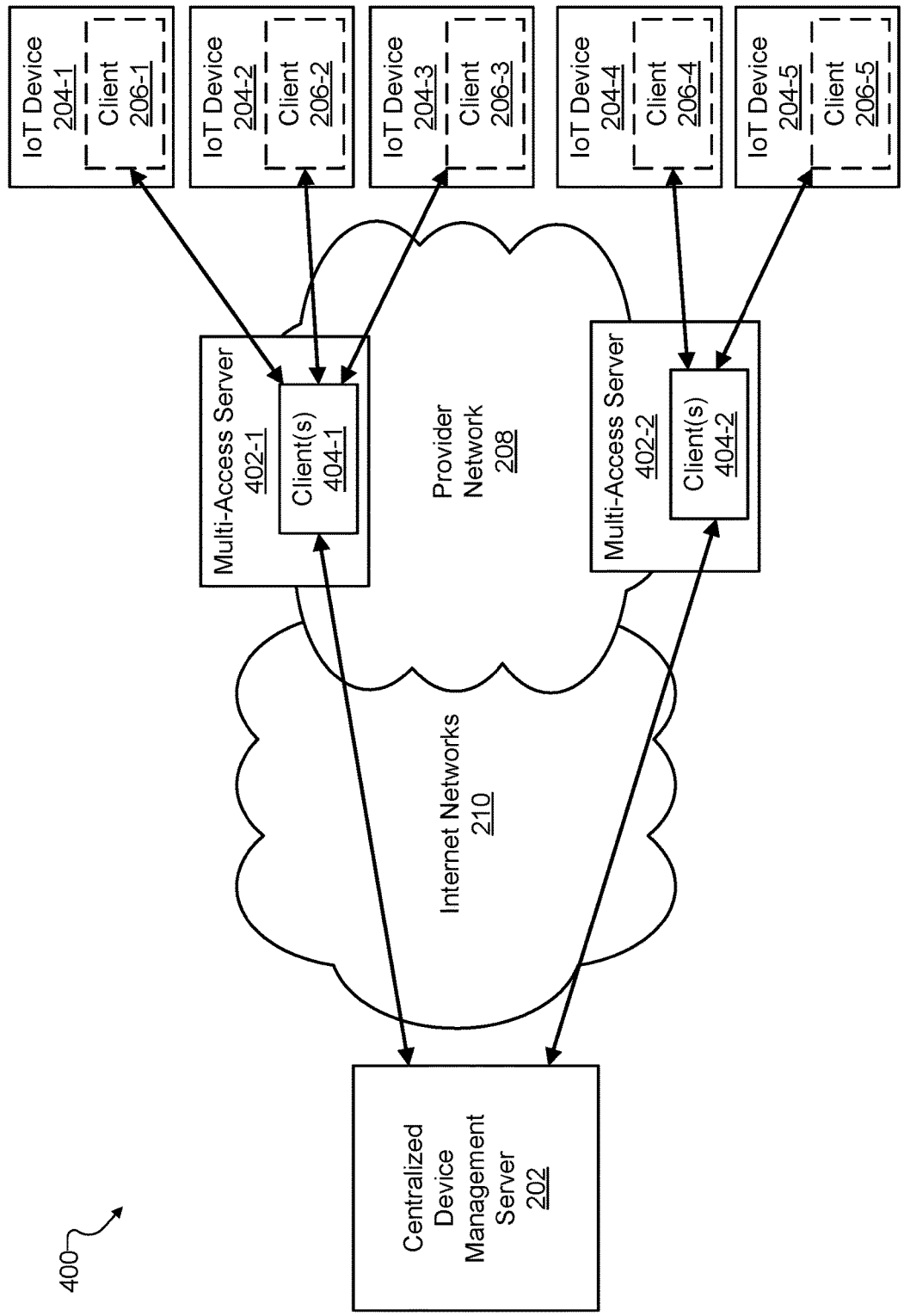
FIG. 4 illustrates an exemplary configuration in which the client virtualization system of FIG. 1 is implemented by Multi-access Edge Compute ("MEC")-based multi-access servers according to embodiments described herein.

To illustrate how a multi-access server may improve the conventional configuration of FIG. 2, FIG. 3 shows an exemplary configuration 300 in which system 100 is implemented by several cloud-based multi-access servers 302 (e.g., "multi-access servers" or "cloud servers" 302-1 and 302-2, as well as additional cloud servers not explicitly shown), and FIG. 4 shows an exemplary configuration 400 in which system 100 is implemented by several MEC-based multi-access servers 402 (e.g., "multi-access servers" or "MEC servers" 402-1 and 402-2, as well as additional MEC servers not explicitly shown).

Specifically, as shown in FIG. 3, cloud servers 302-1 and 302-2 are each depicted as being implemented on Internet networks 210, external to provider network 208. As such, management server 202 may communicate device management messages to multi-access servers 302 by way of Internet networks 210, and cloud servers 302 may each deliver the device management messages to (as well as receive responses or other messages from) IoT devices 204 with which the individual cloud servers 302 are associated. As shown, exchanging data between cloud servers 302 and IoT devices 204 may require use of both provider network 208 and Internet networks 210.

In contrast, as shown in FIG. 4, MEC servers 402-1 and 402-2 are each depicted as being implemented on provider network 208. As such, management server 202 may communicate device management messages to MEC servers 402 by way of Internet networks 210 and provider network 208, and MEC servers 402 may similarly deliver the device management messages to, and receive responses or other messages from, IoT devices 204. MEC servers 402 differ, however, from cloud servers 302 in the sense that exchanging data between MEC servers 402 and IoT devices 204 may be performed using only provider network 208, and not Internet networks 210, thereby reducing transport latency of communications significantly as compared to cloud servers 302.

As mentioned above, various advantages may be exclusively provided, or at least most pronounced, when travel latency between a multi-access server and an IoT device is relatively short, when backhaul is minimal, and so forth. Accordingly, such advantages associated with low latency and/or reduced backhaul may only be achieved, or may be most beneficial, when system 100 is implemented on a MEC-based multi-access server (e.g., such as a MEC server 402) rather than on a cloud-based multi-access server (e.g., such as a cloud server 302). For example, when management server 202 is implemented on a cloud server external to provider network 208 and multi-access servers are implemented as MEC servers on provider network 208, as shown in configuration 400, any of the following advantages or benefits may be achieved.

In implementations where IoT devices 204 are only "awake" (i.e., operating in a communicative or responsive power mode rather than a low power mode in which communications are ignored) for a relatively brief window of time, it may be especially beneficial to deliver as much data as possible to IoT devices 204 during these brief windows to maximize efficiency, increase battery life, and so forth. When a virtualized device management client executing in a MEC server 402 receives and delivers device management messages in accordance with device-oriented protocols (i.e., in a manner that is optimized for IoT devices 204 rather than for management server 202), it is advantageous for transport latencies to be as short as possible to allow IoT devices 204 to be awake for as short a time as possible while still ensuring that messages are reliably delivered (e.g., including resending messages when communication errors occur, etc.).

As another exemplary benefit of the low latency that MEC servers 402 provide, diagnostic alerts provided by IoT devices 204 may indicate that a particular device needs to be quickly reconfigured, replaced (e.g., routed around by other IoT devices 204, replaced by a standby IoT device 204, etc.), or removed (e.g., taken offline due to providing faulty data, etc.). For certain applications, the real-time responsiveness of system 100 to such alerts may be important or even mission critical to the application. As such, being implemented on a MEC server such as one of multi-access servers 402 may allow system 100 to achieve the responsiveness requisite to such applications whereas being implemented on a cloud server such as one of multi-access servers 302 may not.

Configuration 300 of FIG. 3 shows that multi-access servers 302 may each host one or more virtualized device management clients 304 (denoted as "Client(s)" 304-1 and 304-2 to indicate that one or more clients may be represented as will be described in more detail below). Similarly, configuration 400 of FIG. 4 shows that multi-access servers 402 may each host one or more virtualized device management clients 404 (similarly denoted as "Client(s)" 404-1 and 404-2 for the same reason). As shown in both configurations 300 and 400, localized device management clients 206 in IoT devices 204 are each depicted with a dashed border, rather than a solid border as in configuration 200 of FIG. 2. This dashed border will be understood to indicate that localized device management clients 206 are optional in these configurations. More particularly, for example, virtualized device management clients 304 or 404 may be configured, in some cases (e.g., for certain IoT devices 204, for certain implementations, etc.) to supplement and interoperate with localized device management clients 206 that concurrently execute on IoT devices 204. Conversely, in other cases (e.g., for other IoT devices 204, for other implementations, etc.), virtualized device management clients 304 or 404 may be configured to stand in for (i.e., replace) localized device management clients 206 such that no such localized device management clients need to execute on IoT devices 204 at all.

Figure 5:
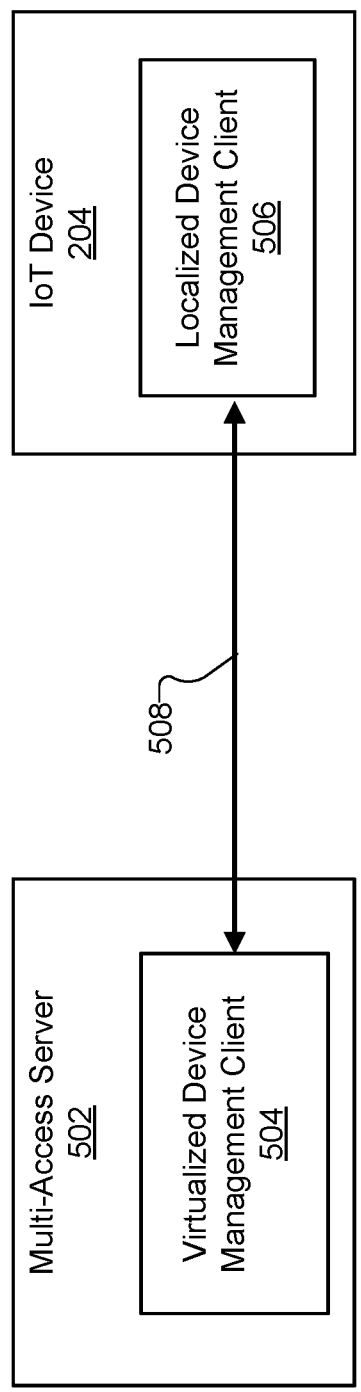
FIG. 5 illustrates exemplary virtualized client management of an IoT device locally executing a localized device management client according to embodiments described herein.
Figure 6:
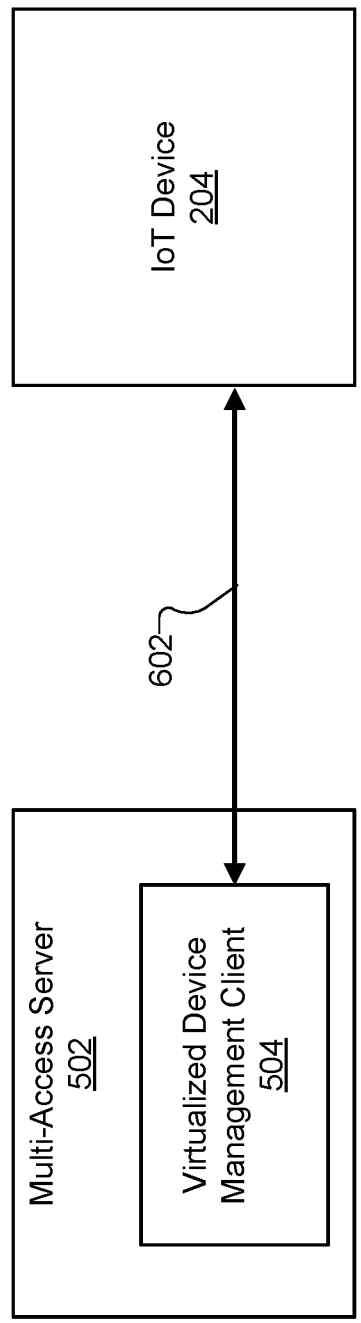
FIG. 6 illustrates exemplary virtualized client management of an IoT device abstaining from locally executing a localized device management client according to embodiments described herein.

To illustrate each of these scenarios in more detail, FIG. 5 shows exemplary virtualized client management of an IoT device 204 that is locally executing a localized device management client, while FIG. 6 shows exemplary virtualized client management of an IoT device 204 that is abstaining from locally executing a localized device management client.

More specifically, FIG. 5 shows a multi-access server 502 that may represent any of the multi-access servers described herein (e.g., including one of cloud servers 302 or MEC servers 402), a virtualized device management client 504 hosted by multi-access server 502, and a localized device management client 506 executing on the IoT device 204. Accordingly, in this example, the IoT device 204 is configured to locally execute localized device management client 506, which is configured to interoperate with virtualized device management client 504 in any suitable way.

For example, if a centralized device management server (e.g., management server 202) transmits, to multi-access server 502, a device management message intended for the IoT device 204, multi-access server 502 may be configured to instantiate virtualized device management client 504 to serve the IoT device 204. For instance, virtualized device management client 504 may be specifically configured to provide service for the make, model, firmware version, configuration, and/or other such characteristics of the IoT device 204. Once virtualized device management client 504 has been thus instantiated, any device-management-related interactions (e.g., device management messages, responses, reports, errors, etc.) may take place between the centralized device management server and virtualized device management client 504. This allows for all configuration changes that are to be performed on the IoT device 204 to be staged virtually even while the IoT device 204 is offline (e.g., is in a sleep mode, is in a power-saving mode, is unreachable due to network congestion, etc.). Then, once the IoT device 204 comes online (e.g., which may be for only a relatively short time in certain examples), localized device management client 506 may be configured to contact virtualized device management client 504 via a communication link 508.

Communication link 508 may implement or employ any suitable interface, protocol, or communication method including, without limitation, a Representational State Transfer ("REST") Application Programming Interface ("API"), a HyperText Transfer Protocol ("HTTP") or HyperText Transfer Protocol Secure ("HTTPS") protocol, a Message Queuing Telemetry Transport ("MQTT") interface, or the like. Regardless of which interface, technologies, or communication techniques are used to communicate data over communication link 508, communications may be said to take place by way of a "device-oriented protocol" when communication between the IoT device 204 and multi-access server 502 is performed based on timing, availability, or other aspects convenient to the IoT device 204 (rather than, for example, the timing, availability, and/or what is convenient for multi-access server 502, the centralized device management server, etc.). Accordingly, when communication is performed by way of a device-oriented protocol, extraneous pings that may clog the network, messages that may go unreceived due to the IoT device 204 being offline, and other similar issues may be mitigated or eliminated altogether. For example, in accordance with a device-oriented protocol, communication between multi-access server 502 and IoT device 204 may not occur or even be attempted unless the IoT device 204 is online and/or the IoT device 204 initiates the communication. When the IoT device 204 wakes up or comes online (e.g., which may be relatively rarely or briefly, as described above), a device-oriented protocol may call for communication to be initiated immediately so as to avoid wasting time and battery life of the IoT device 204. In sum, the IoT device may define or determine or dictate how and when any communication is exchanged with multi-access server 502 when a device-oriented protocol is employed.

Certain advantages may be associated with a dual-client setup (i.e., a setup including both a virtualized and a localized device management client) such as is illustrated in FIG. 5. For example, legacy IoT devices that already are deployed and configured to execute localized device management clients may continue to be used as they are (or with firmware updates or the like) rather than needing to be replaced by new IoT devices configured to utilize only the virtualized device management client hosted on the multi-access server. At the same time, significant computing resources and battery life may still be saved and/or conserved by offloading, to the virtualized device management client, much of the device management and server communication work previously performed by the localized device management client alone. Yet another advantage of a dual-client setup is that the localized device management client may be configured to complement or be redundant to the virtualized device management client in certain respects to help avoid or recover from error conditions or the like.

FIG. 6 is similar to FIG. 5, but shows multi-access server 502 and virtualized device management client 504 in communication with an IoT device 204 that is not executing any localized device management client. Accordingly, in this example, the IoT device 204 may abstain from locally executing a localized device management client such that virtualized device management client 504 is configured to serve as the sole device management client for the IoT device 204.

In the example of FIG. 6, if a centralized device management server such as management server 202 transmits, to multi-access server 502, a device management message for the IoT device 204, multi-access server 502 may again be configured to instantiate virtualized device management client 504 to serve the IoT device 204. However, rather than sending updates or synchronizing with a localized device management client as in the example of FIG. 5, virtualized device management client 504 may serve as the only device management client for the IoT device 204, and may send direct commands to instantiate parameter changes, perform services (e.g., LWM2M services, etc.), and so forth by way of REST API calls, HTTP-based interfaces, or other suitable communications over a communication link 602.

As with the dual-client setup illustrated in FIG. 5, certain advantages may also be associated with a single-client setup (i.e., a setup including only the virtualized and not the localized device management client) such as is illustrated in FIG. 6. For example, the convenient architecture for the centralized device management server (e.g., in which the virtualized device management client is always awake and responsive) provides similar benefits as described above, while the device management client footprint on the IoT device 204 is reduced even more (i.e., the IoT device 204 does not have to reserve any resources for storing and/or executing a localized device management client), resulting in the same or even more computing resource and battery life benefits as are described with respect to FIG. 5. Moreover, as mentioned above, the development work required of an OEM entity providing the IoT device 204 may also be significantly reduced because no localized device management client needs to be installed, developed, or tested (e.g., compliance validation) for the IoT device 204.

An example will now be provided to illustrate the interoperation of an exemplary implementation of system 100

(which is implemented by an exemplary implementation of multi-access server 502) with an exemplary implementation of management server 202 and an exemplary IoT device 204. Specifically, FIG. 7 shows an exemplary performance of operations and communications to virtualize a device management client in a multi-access server separate from a device in accordance with the methods and systems described herein.

Figure 7:
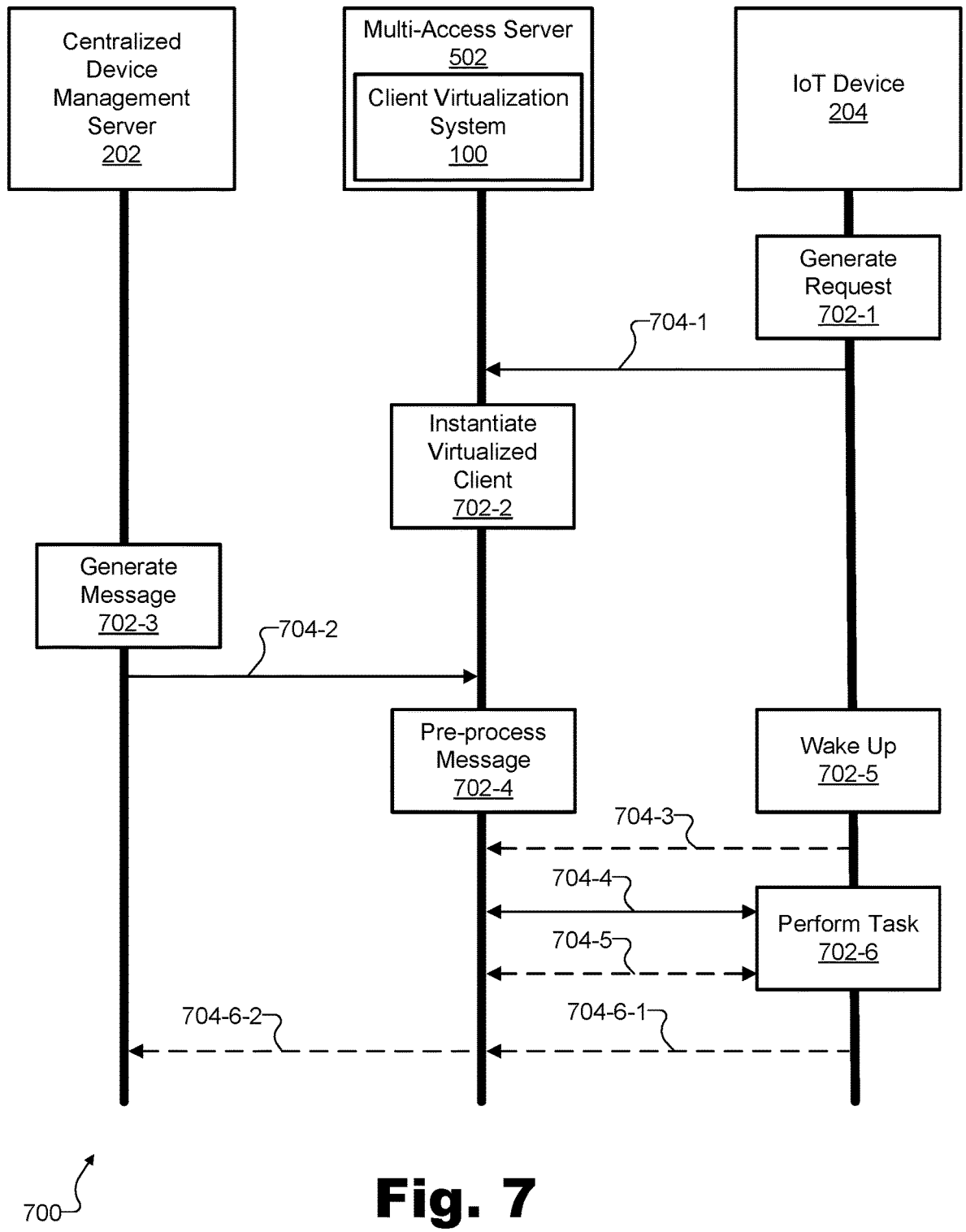
FIG. 7 illustrates an exemplary performance of operations and communications to virtualize a device management client in a multi-access server separate from a device according to embodiments described herein.

FIG. 7 illustrates an exemplary performance 700 of various operations and communications between system 100 (implemented by multi-access server 502), management server 202, and IoT device 204 to virtualize a device management client in multi-access server 502, which is separate from the IoT device 204 that the virtualized device management client is associated with. Specifically, as time moves forward from the top of FIG. 7 to the bottom of FIG. 7, performance 700 shows certain operations 702 (e.g., operations 702-1 through 702-6) that are performed by the IoT device 204 (i.e., operations 702-1, 702-5, and 702-6), system 100 (i.e., operations 702-2 and 702-4), and management server 202 (operation 702-3). Additionally, in connection with operations 702, performance 700 shows certain communications 704 (e.g., communications 704-1 through 704-5 and communications 704-6-1 and 704-6-2) between management server 202, system 100, and/or the IoT device 204 to enable and facilitate operations 702. Each of operations 702 and communications 704 will now be described in more detail.

Performance 700 begins when the IoT device 204 performs operation 702-1 ("Generate Request") by generating a service request requesting system 100 to instantiate a virtualized device management client configured to provide client management services for the IoT device 204 (e.g., in cooperation with, or in place of, a localized device management client executing on the IoT device 204, as described above). In order for system 100 to instantiate a suitable virtualized device management client for the IoT device 204, system 100 may require data indicative of various characteristics of the IoT device 204. As such, the service request generated at operation 702-1 may include data representative of any IoT device 204 characteristics as may serve to help identify and define the IoT device 204 to system 100 in a particular implementation.

For example, in certain implementations, the service request generated at operation 702-1 may indicate a hardware characteristic of the IoT device 204 (e.g., a make or manufacturer of the IoT device 204, a model number of the IoT device 204, an indication of computing resources included within the IoT device 204, etc.) such that system 100 may perform the instantiating of the virtualized device management client based on the hardware characteristic. In the same or other implementations, the service request generated at operation 702-1 may indicate a software characteristic of the IoT device (e.g., a type of firmware executing on the IoT device 204, a version of the firmware executing on the IoT device 204, etc.) such that system 100 may perform the instantiating of the virtualized device management client based on the software characteristic. In the same or other implementations, the service request generated at operation 702-1 may indicate a configuration characteristic of the IoT device (e.g., a set of control parameters applied to the IoT device 204, details about the sleep/wake cycle of the IoT device 204, etc.) such that system 100 may perform the instantiating of the virtualized device management client based on the configuration characteristic. Any of these or other suitable characteristics may be indicated in the service request generated at operation 702-1 in order to fully define the IoT device 204 to system 100 as may be appropriate for a particular implementation. Then, at communication 704-1, the service request may be provided to (e.g., transmitted to, communicated with, etc.) system 100 on the multi-access server 502 that is separate from the IoT device 204.

At operation 702-2 ("Instantiate Virtualized Client"), system 100 may receive the service request provided by communication 704-1 from the IoT device 204, and, in response to and/or based on the service request, may instantiate a virtualized device management client to serve the IoT device 204. Specifically, system 100 may instantiate the virtualized device management client to be hosted on multi-access server 502, rather than on the IoT device 204 that the virtualized device management client is configured to serve.

Among various advantages described herein of virtualizing the device management client as a service provided to IoT device 204 by multi-access server 502, one advantage is that a single virtualized device management client may be configured to serve a plurality of like IoT devices 204. For example, if the IoT device 204 in FIG. 7 indicates that it has certain characteristics (e.g., hardware characteristics, software characteristics, configuration characteristics, etc.) in common with other IoT devices 204 for which system 100 has already instantiated a virtualized device management client, system 100 may have no need to generate yet another virtualized device management client, but, rather, may be configured to "instantiate" the virtualized device management client for the IoT device 204 by assigning the same virtualized device management client to serve all of the IoT devices 204 that are suitably similar to one another. As a result, for use cases in which large numbers of identical or similar IoT devices 204 are employed (e.g., large numbers of identical sensor IoT devices distributed throughout a particular industrial system, etc.), a single device management client hosted on multi-access server 502 may serve all of the IoT devices rather than each IoT device requiring a dedicated virtualized device management client.

FIGS. 8A and 8B illustrate how this advantage may simplify communications and thereby conserve computing resources for management server 202 and/or multi-access server 502. Specifically, FIG. 8A shows exemplary aspects of a localized client management scheme for managing IoT devices (i.e., a client management scheme in which management server 202 manages IoT devices by way of individual localized device management clients associated with each IoT device), while FIG. 8B shows exemplary aspects of a virtualized client management scheme for managing the same IoT devices (i.e., a client management scheme in which management server 202 manages the IoT devices by way of virtualized device management clients that may each serve more than one IoT devices).

In FIG. 8A, management server 202 is shown to communicate with various IoT devices 802, which will be understood to be specific implementations of IoT devices 204 described above. As indicated by the numbering scheme used for IoT devices 802, certain IoT devices 802 may have common characteristics with other IoT devices 802. Specifically, IoT devices 802 labeled 802-1 (i.e., IoT devices 802-1-1 through 802-1-3) will all be understood to have sufficient common characteristics (e.g., make, model, firmware version, etc.) as to be served by the same device management client, as will other subsets of IoT devices 802 labeled with the same reference designation (e.g., IoT devices 802-3, 802-4, etc.). In contrast, it will be understood that, while IoT devices 802 labeled with different numbers (e.g., an IoT device 802-1 and IoT device 802-2, etc.) may have certain common characteristics, these commonalities may not be sufficient to allow the IoT devices to be served by the same device management client. For example, all of IoT devices 802 shown in FIG. 8A may have the same hardware characteristics as one another (e.g., may be the same make and model, etc.), but differently numbered subsets of IoT devices 802 may have different software characteristics (e.g., firmware versions, etc.), different configuration characteristics (e.g., different control parameters, etc.), or the like. The common characteristics needed for a particular device management client to serve multiple IoT devices may be dependent on the device management client itself and may be defined in any suitable way (e.g. in accordance with or different from this example) for a given implementation.

In FIG. 8A, management server 202 is shown to communicate individually with a localized device management client of each individual IoT device 802 despite that various subsets of IoT devices 802 exist (as described above) that could be served by a single device management client. Specifically, as shown, an individual communication 804 (e.g., communications 804-1 through 804-10) connects each IoT device 802 directly to management server 202. This may be acceptable for relatively small numbers of IoT devices 802, but may become increasingly inefficient and problematic as the number of IoT devices 802 scales up. Particularly when each locally managed IoT device 802 is offline for a significant portion of the time, the configuration shown in FIG. 8A indicates that the number of extraneous pings and unreceived communications between management server 202 and offline IoT devices 802 may put significant strain on communication resources (e.g., including network resources) when there is a large number of IoT devices 802.

In contrast, FIG. 8B illustrates how the methods and systems described herein for virtualizing device management clients in a multi-access server separate from IoT devices being served by the virtualized device management clients can decrease the complexity of communications for management server 202. As shown in FIG. 8B, each subset of IoT devices 802 (i.e., the subset of IoT devices 802-1, the one-device subset of IoT device 802-2, the subset of IoT devices 802-3, and the subset of IoT devices 802-4) may be associated with a single virtualized device management client 806 (labeled as "Virtual Clients" or "VClient" 806-1 through 806-4), as shown. As a result, significantly fewer instances of communication 804 (e.g., only four, rather than ten, in this example) may be performed by management server 202, and each of these may be much more likely to result in successful communication since virtualized device management clients 806 may be always enabled and ready for communications since they are hosted by a multi-access server. Whenever a particular IoT device 802 wakes up and needs to receive updates or check other device management messages, the IoT device 802 may simply communicate with the appropriate virtualized device management client 806 on the terms of the IoT device 802 itself (e.g., by way of the device-oriented protocol, as described above).

In accordance with FIG. 8B, it will be understood that system 100 may receive, along with a first service request, a second service request from a second IoT device and a third service request from a third IoT device, where the second and third IoT devices are both separate from and communicatively coupled to the multi-access server like the first IoT device. System 100 may determine that the second IoT device is distinct from the first IoT device with respect to a characteristic, and that the third IoT device is equivalent to the first IoT device with respect to the characteristic. Accordingly, in response to these determinations, system 100 may instantiate a second virtualized device management client to serve the second IoT device (where the second virtualized device management client is hosted on the multi-access server with the first virtualized device management client), and may assign the virtualized device management client to further serve the third IoT device along with serving the IoT device. For example, if virtualized device management client 806-1 has been instantiated for IoT devices 802-1-1 and 802-1-2 when IoT devices 802-1-3 and 802-2 provide respective service requests, system 100 may determine that IoT device 802-1-3 may be assigned to virtualized device management client 806-1 with the other IoT devices 802-1 (i.e., due to the characteristics that all of the IoT devices 802-1 have in common) while determining that a new virtualized device management client (i.e., virtualized device management client 806-2) must be instantiated to serve IoT device 802-2 (i.e., due to the characteristics that are different in IoT device 802-2 from IoT devices 802-1).

Returning to FIG. 7, once a virtualized device management client has been instantiated (e.g., by either generating a new virtualized device management client, or by assigning an existing virtualized device management client) for the IoT device 204 in operation 702-2, system 100 may be prepared to use the virtualized device management client to provide client management services directed by management server 202 for the IoT device 204.

Operation 702-3 ("Generate Message") is shown to be performed by management server 202 to initiate such client management. Specifically, at operation 702-3, management server 202 may generate a device management message for the IoT device 204. As used herein, a device management message may include any instructions (e.g., commands), data (e.g., firmware updates, etc.), or other information that management server 202 may provide to the IoT device 204 to manage the IoT device 204. For instance, to provide a few specific examples, the device management message generated at operation 702-3 and delivered to the IoT device 204 may include or be representative of one or more of a notification that updated instructions are pending for the IoT device (e.g., a new firmware version is available to be loaded), a command to update instructions being executed on the IoT device 204 (e.g., a command to upgrade to a new firmware version that may be included within the message), a command to change a configuration parameter set on the IoT device, a command to change a schedule followed by the IoT device, a request for the IoT device to provide status information (e.g., a request for a sensor reading such as a temperature reading, a strain reading, etc.), a command for the IoT device to perform a particular task (e.g., an automation task in a manufacturing or warehouse automation application), or any other suitable device management message as may serve a particular implementation.

Once the device management message is generated at operation 702-3, management server 202 may transmit, at communication 704-2, the device management message to the virtualized device management client instantiated by system 100 and hosted by multi-access server 502. Because the virtualized device management client may be always active and ready to receive such device management messages (rather than being likely to be in a low-power or sleep mode, as may be the case with localized device management clients executing on IoT devices in a conventional configuration such as illustrated in FIG. 8A), management server 202 may generate and transmit the device management message at whatever time is convenient to management server 202 and/or multi-access server 502. For example, management server 202 may generate and transmit device management messages during times when there is less traffic between management server 202 and multi-access server 502 (e.g., during the night or during other off-peak times). In many cases, the device management message transmitted in communication 704-2 may be expected to be received by the virtualized device management client hosted by multi-access server 502 from the first transmission attempt, and, in contrast with conventional configurations, no pinging and/or unsuccessful attempts to convey the message may be necessary or expected.

At operation 702-4 ("Pre-process Message"), system 100 (e.g., the particular virtualized device management client instantiated by system 100 that is hosted by multi-access server 502) may perform any suitable pre-validation operation(s) with respect to the device management message received, such that system 100 may deliver the device management message to the IoT device 204 based on, or in accordance with, the pre-validation operation(s). More specifically, system 100 may analyze the device management message sent by management server 202 in light of the current state of the IoT device 204 (and the virtualized device management client serving the IoT device 204) to determine which portions of device management message are relevant, how the device management message may be applied most efficiently to the IoT device 204, and so forth.

As one example of a pre-validation operation that may be performed at operation 702-4, the device management message may include a new firmware version and a command for the IoT device 204 to upgrade to the new firmware version. Rather than simply forwarding the entire device management message to the IoT device in accordance with the device-oriented protocol (e.g., when the IoT device 204 wakes up), which may be performed in certain implementations, system 100 may, in other implementations, pre-validate the new firmware version in one or more ways and forward only certain information to the IoT device 204. For example, system 100 may ensure that the IoT device 204 has sufficient resources (e.g., storage to store the new version, processing and memory capabilities required by the new version, etc.) to operate correctly with the new firmware version prior to applying the new firmware version. As another example, system 100 may determine "delta changes" between the current and new firmware versions so as to only transmit instructions and portions of the new firmware version that are needed to upgrade the new firmware version from the current firmware version (rather than the entirety of the new firmware version including redundant portions that are the same as the current firmware version used on the IoT device 204).

As another example of a pre-validation operation that may be performed at operation 702-4, the device management message may include an instruction to modify a control parameter of the IoT device 204 only if particular circumstances exist. Rather than simply forwarding the instruction and allowing the IoT device 204 to determine if the particular circumstances exist, system 100 may first determine whether particular conditions are met, and, only if they conditions are met, forwarding the instruction without any indication of the circumstantial requirements. For instance, management server 202 may send an instruction to alter a temperature threshold parameter of the IoT device 204 if particular environmental conditions are met such as that the sensor has not overheated and there is sufficient storage space in the IoT device 204 to store the additional readings expected to occur when the threshold is altered. Rather than relaying all of this to the IoT device 204 to analyze, system 100 may pre-process this instruction by determining (e.g., based on data maintained by system 100 for the IoT device 204) whether the sensor overheating and storage space conditions are met, and, only if they are, sending a command for the temperature threshold parameter of the IoT device 204 to be altered in accordance with the device management message.

Other pre-processing (e.g., pre-validation operations) that may be performed at operation 702-4 may relate to ensuring that the device management message is intended for the appropriate characteristics of the IoT device 204 (e.g., intended for the appropriate make, model, firmware version, configuration, etc.) to ensure that the package is applicable, ensuring that the device management message is properly signed and authenticated, ensuring that the device management message has been properly received without error (e.g., based on checksum and signature validation or the like), and so forth. All of these types of operations described above, as well as other suitable pre-processing operations may be performed more efficiently by system 100 on multi-access server 502 than on the IoT device 204, and may thus be beneficial to offload from the IoT device 204 to conserve computing resources of the IoT device 204.

Just as the device management message may be transmitted during off-peak hours or at other times that are convenient for management server 202 and/or multi-access server 502, the pre-validation operations of operation 702-4 described herein may be performed at any time as may serve a particular implementation. For example, multi-access server 502 may perform pre-processing operations during off-peak times when multi-access server 502 is not as busy performing other tasks, immediately after receiving the device management message from management server 202 (e.g., even if that is a significant amount of time before IoT device 204 will wake up and request the device management message), immediately before providing the device management message (or the delta changes associated with the device management message) to the IoT device 204 (e.g., even if that is a significant amount of time after system 100 received the device management message from management server 202), or at any other time as may serve a particular implementation.

At operation 702-5 ("Wake Up"), the IoT device 204 may leave the low-power or sleep mode that it may be in most of the time to conserve battery, and may come online to check if any device management messages have been received since the last time the IoT device 204 checked in with the virtualized device management client serving it. As mentioned above, this waking up of the IoT device 204 may be configured to occur on any suitable schedule (e.g., based on the programming of the IoT device 204, based on the needs of the application for which the IoT device 204 is used, etc.), including on a schedule that is relatively infrequent. For instance, in certain implementations, the IoT device 204 may only wake up once a day, once a week, or the like.

Upon awaking at operation 702-5, the IoT device 204 may provide communication 704-3 to system 100 to indicate that the IoT device 204 has come online and would like to check in (e.g., to request client management services as may be applicable). This communication may be transmitted by way of the REST API or any other suitable communication method described herein. In certain examples, communication 704-3 may be unnecessary because system 100 may have pre-scheduled a time to initiate communication with the IoT device 204 (rather than waiting for an indication that the IoT device 204 is awake). Accordingly, communication 704-3 is depicted as a dashed line to indicate that it is optional.

Upon receiving this request of communication 704-3, system 100 may begin communicating with the IoT device 204 to deliver any applicable device management message (e.g., any applicable portions of a device management message as may be determined by the pre-processing of operation 702-4) to the IoT device 204 by way of a device-oriented protocol. As shown, communication 704-4 is depicted as a bidirectional communication to indicate that data may be exchanged in both directions between system 100 and the IoT device 204. For example, device management messages may be transmitted from system 100 to the IoT device 204 and acknowledgements or responses to the device management messages may be transmitted back from the IoT device 204 to system 100. As another example, IoT device 204 may initiate device management messages such as to indicate that an error has been detected, or the like.

Communication 704-5 is another bidirectional communication between system 100 and the IoT device 204 that represents data exchange that is repeated when communication 704-4 is detected to experience issues (e.g., dropped packets, data errors, etc.). Packet loss or data errors may be experienced on any network for a variety of reasons, but various protocols may be used to direct data to be resent when necessary to ensure that integral data is ultimately communicated. Communication 704-5 is a dashed line representing that such data retransmission may be performed whenever a communication error or issue is detected. In examples where multi-access server 502 is implemented by a MEC server or other relatively low-latency multi-access server, such repeated communication may be significantly more efficient (e.g., in terms of the time, battery life, and resources consumed) than when a cloud server or other relatively high-latency multi-access server is employed. Such efficiency may be highly beneficial for circumstances in which relatively large device management messages are being communicated, such as large firmware update files or the like.

At operation 702-6, the IoT device 204 may perform any operations or tasks as may be directed by management server 202 by way of the device management message. For example, the IoT device 204 may update the firmware version, alter the control parameters, provide a status update, provide a sensor reading, report an error, or perform any other necessary task (e.g., as directed by management server 202 or otherwise).

Communications 704-6 (i.e., communication 704-6-1 from the IoT device 204 to system 100 and communication 704-6-2 from the IoT device 204 or system 100 to management server 202) may represent the reporting or communication of any suitable information (e.g., diagnostics, errors, status reports, sensor readings, etc.) from the IoT device 204 back to system 100 and/or management server 202. As mentioned above, in certain examples, such communications may be performed in real time as issues occur so that the content of communications 704-6 may be quickly analyzed and acted upon (e.g., to mitigate errors or other issues, etc.). In other examples, such communications may be performed in non-real time (e.g., according to a sleep/wake schedule of the IoT device 204 or the like).

Figure 9:
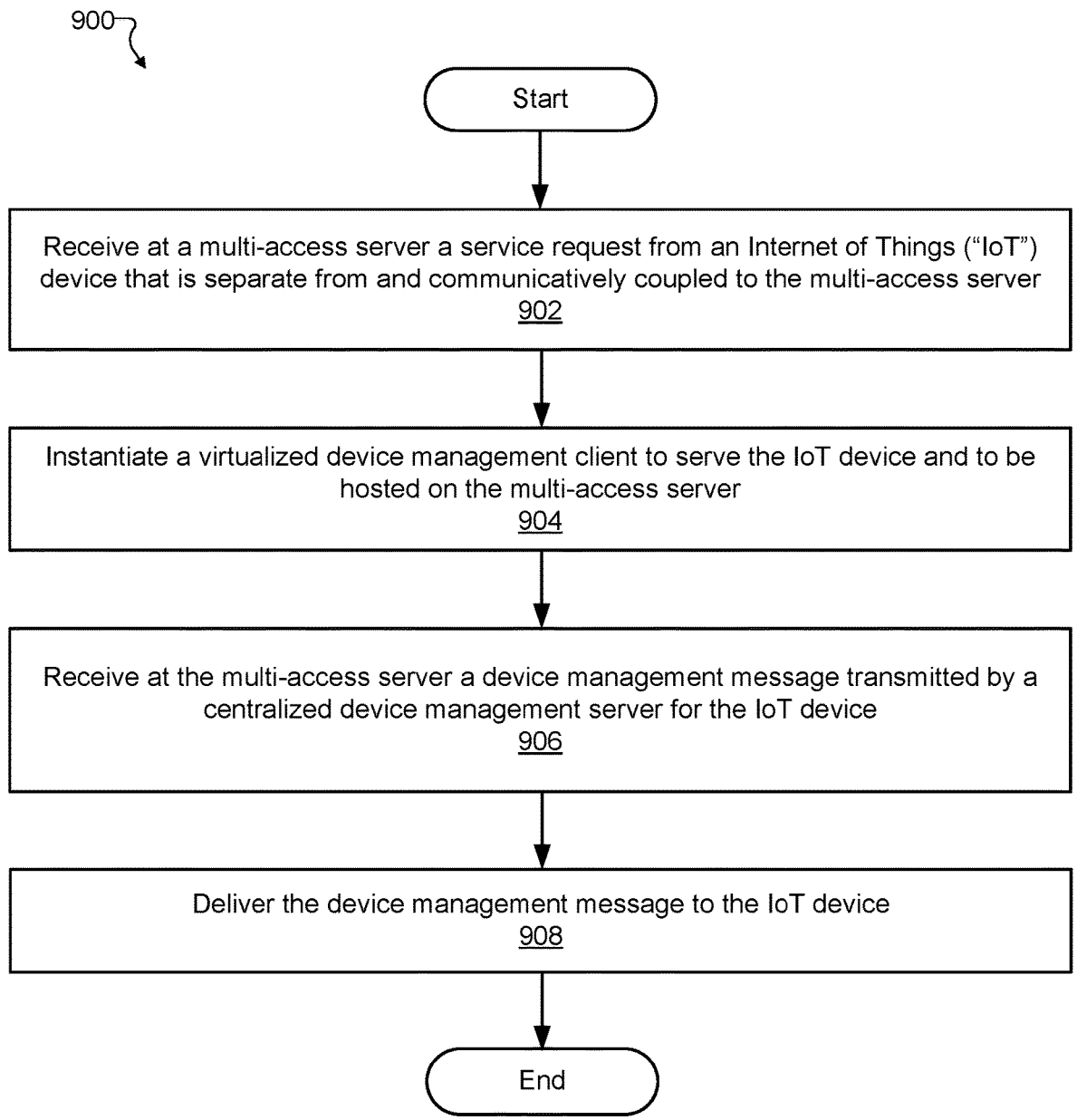
FIG. 9 illustrates an exemplary method for virtualizing a device management client in a multi-access server separate from a device according to embodiments described herein.

FIG. 9 illustrates an exemplary method 900 for virtualizing a device management client in a multi-access server separate from a device. While FIG. 9 illustrates exemplary operations according to one embodiment, other embodiments may omit, add to, reorder, and/or modify any of the operations shown in FIG. 9. One or more of the operations shown in FIG. 9 may be performed by system 100, any components included therein, and/or any implementation thereof.

In operation 902, a client virtualization system implemented by a multi-access server may receive a service request from an IoT device that is separate from and communicatively coupled to the multi-access server. Operation 902 may be performed in any of the ways described herein.

In operation 904, the client virtualization system may instantiate a virtualized device management client to serve the IoT device. For example, the client virtualization system may instantiate the virtualized device management client in response to the service request received in operation 904. In some examples, the virtualized device management client may be hosted on the multi-access server. Operation 904 may be performed in any of the ways described herein.

In operation 906, the client virtualization system may receive a device management message transmitted by a centralized device management server for the IoT device. For example, the client virtualization system may receive the device management message directly from the centralized device management server. Operation 906 may be performed in any of the ways described herein.

In operation 908, the client virtualization system may deliver the device management message to the IoT device. Operation 908 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
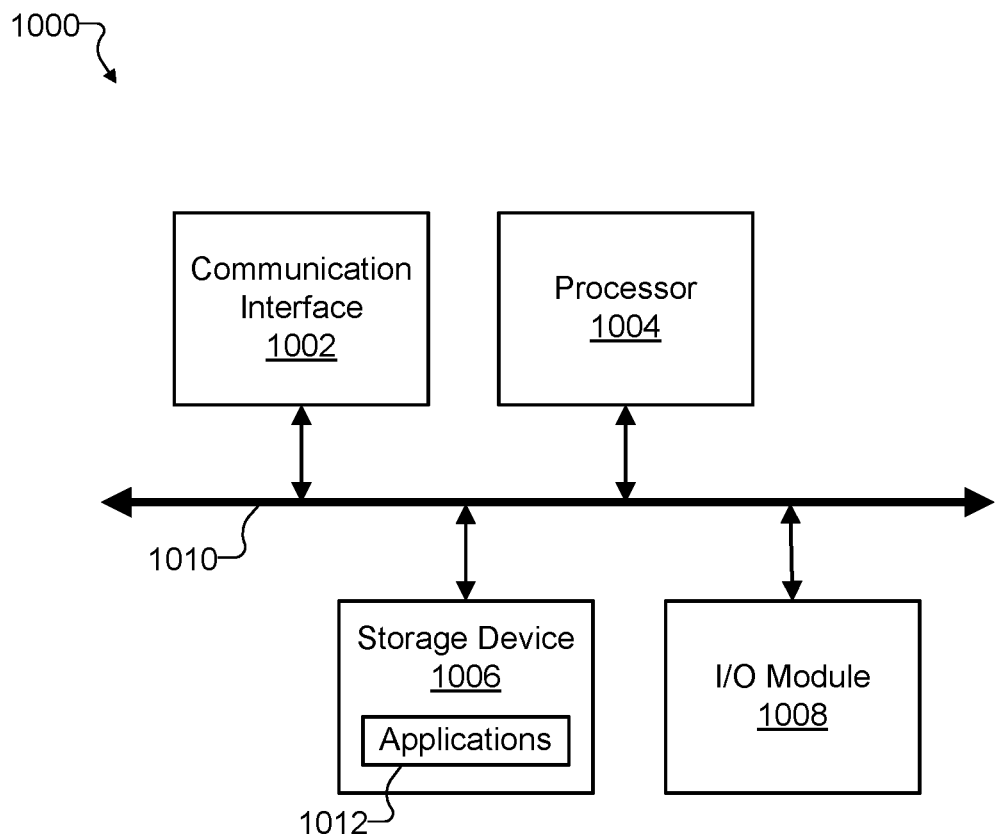
FIG. 10 illustrates an exemplary computing device according to principles described herein.

FIG. 10 illustrates an exemplary computing device 1000 that may be specifically configured to perform one or more of the processes described herein. For example, computing device 1000 may implement a multi-access server (e.g., any of multi-access servers 302, 402, or 502), which may, in turn, implement a client virtualization system such as system 100. In other examples, computing device 1000 may implement other computing systems and devices described herein such as management server 202, any of IoT devices 204, and/or any other computing systems or devices described herein.

As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processing facility 104 of system 100. Likewise, storage facility 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a client virtualization system implemented by a multi-access server, a service request from an Internet of Things ("IoT") device that is separate from and communicatively coupled to the multi-access server;
    instantiating, by the client virtualization system and in response to the service request, a virtualized device management client to serve the IoT device, the virtualized device management client hosted on the multi-access server;
    receiving, by the client virtualization system from a centralized device management server, a device management message transmitted by the centralized device management server for the IoT device;
    virtually staging, by the client virtualization system and based on the device management message and while the IoT device is offline, a configuration change that is to be performed on the IoT device; and delivering, by the client virtualization system and in response to communication from the IoT to indicate that the IoT device has come online and requests any device management messages that have been received, the device management message to the IoT device to direct the virtually staged configuration change to be performed on the IoT device.

2. The method of claim 1, wherein the IoT device abstains from locally executing a localized device management client such that the virtualized device management client hosted on the multi-access server is configured to serve as the sole device management client for the IoT device.

3. The method of claim 1, wherein the IoT device locally executes a localized device management client with which the virtualized device management client hosted on the multi-access server is configured to interoperate.

4. The method of claim 1, wherein:
the service request received from the IoT device indicates at least one of a hardware characteristic of the IoT device, a software characteristic of the IoT device, and a configuration characteristic of the IoT device; and
the client virtualization system performs the instantiating of the virtualized device management client based on the at least one of the hardware characteristic, the software characteristic, and the configuration characteristic.

5. The method of claim 1, wherein the delivering of the device management message is performed by way of a device-oriented protocol for communications between the IoT device and the virtualized device management client.

6. The method of claim 1, further comprising:
receiving, by the client virtualization system, a second service request from a second IoT device and a third service request from a third IoT device, the second and third IoT devices both separate from and communicatively coupled to the multi-access server;
determining, by the client virtualization system, that the second IoT device is distinct from the IoT device with respect to a characteristic, and that the third IoT device is equivalent to the IoT device with respect to the characteristic;
instantiating, by the client virtualization system in response to the second service request and based on the determination that the second IoT device is distinct from the IoT device with respect to the characteristic, a second virtualized device management client to serve the second IoT device, the second virtualized device management client hosted on the multi-access server with the virtualized device management client; and
assigning, by the client virtualization system in response to the third service request and based on the determination that the third IoT device is equivalent to the IoT device with respect to the characteristic, the virtualized device management client to further serve the third IoT device along with serving the IoT device.

7. The method of claim 1, further comprising:
performing, by the client virtualization system in response to the receiving of the device management message, a pre-validation operation with respect to the device management message; and
wherein the delivering of the device management message to the IoT device is performed based on the pre-validation operation.

8. The method of claim 1, wherein the device management message delivered to the IoT device is representative of at least one of:

a notification that updated instructions are pending for the IoT device;
a command to update instructions being executed on the IoT device;
a command to change a configuration parameter set on the IoT device;
a command to change a schedule followed by the IoT device;
a request for the IoT device to provide status information; and
a command for the IoT device to perform a particular task.

9. The method of claim 1, wherein:
the centralized device management server is implemented on a cloud server external to a provider network; and
the multi-access server is implemented as a multi-access edge compute ("MEC") server on the provider network.

10. A system implemented by a multi-access server, the system comprising:
a memory storing instructions; and
a processor included within the multi-access server and communicatively coupled to the memory so as to be configured to execute the instructions to:
receive a service request from an Internet of Things ("IoT") device that is separate from and communicatively coupled to the multi-access server;
instantiate, in response to the service request, a virtualized device management client to serve the IoT device, the virtualized device management client hosted on the multi-access server;
receive, from a centralized device management server, a device management message transmitted by the centralized device management server for the IoT device;
virtually stage, based on the device management message and while the IoT device is offline, a configuration change that is to be performed on the IoT device; and
deliver, in response to communication from the IoT to indicate that the IoT device has come online and requests any device management messages that have been received, the device management message to the IoT device to direct the virtually staged configuration change to be performed on the IoT device.

11. The system of claim 10, wherein the IoT device abstains from locally executing a localized device management client such that the virtualized device management client hosted on the multi-access server is configured to serve as the sole device management client for the IoT device.

12. The system of claim 10, wherein the IoT device locally executes a localized device management client with which the virtualized device management client hosted on the multi-access server is configured to interoperate.

13. The system of claim 10, wherein:
the service request received from the IoT device indicates at least one of a hardware characteristic of the IoT device, a software characteristic of the IoT device, and a configuration characteristic of the IoT device; and
the client virtualization system performs the instantiating of the virtualized device management client based on the at least one of the hardware characteristic, the software characteristic, and the configuration characteristic.

14. The system of claim 10, wherein the delivering of the device management message is performed by way of a device-oriented protocol for communications between the IoT device and the virtualized device management client.

15. The system of claim 10, wherein the processor is further configured to execute the instructions to:
receive a second service request from a second IoT device and a third service request from a third IoT device, the second and third IoT devices both separate from and communicatively coupled to the multi-access server;
determine that the second IoT device is distinct from the IoT device with respect to a characteristic, and that the third IoT device is equivalent to the IoT device with respect to the characteristic;
instantiate, in response to the second service request and based on the determination that the second IoT device is distinct from the IoT device with respect to the characteristic, a second virtualized device management client to serve the second IoT device, the second virtualized device management client hosted on the multi-access server with the virtualized device management client; and
assign, in response to the third service request and based on the determination that the third IoT device is equivalent to the IoT device with respect to the characteristic, the virtualized device management client to further serve the third IoT device along with serving the IoT device.

16. The system of claim 10, wherein:
the processor is further configured to execute the instructions to perform, in response to the receiving of the device management message, a pre-validation operation with respect to the device management message; and
the delivering of the device management message to the IoT device is performed based on the pre-validation operation.

17. The system of claim 10, wherein the device management message delivered to the IoT device is representative of at least one of:
a notification that updated instructions are pending for the IoT device;
a command to update instructions being executed on the IoT device;
a command to change a configuration parameter set on the IoT device;
a command to change a schedule followed by the IoT device;
a request for the IoT device to provide status information; and
a command for the IoT device to perform a particular task.

18. A non-transitory computer-readable medium storing instructions that, when executed, direct a processor of a multi-access server to:
receive a service request from an Internet of Things ("IoT") device that is separate from and communicatively coupled to the multi-access server;
instantiate, in response to the service request, a virtualized device management client to serve the IoT device, the virtualized device management client hosted on the multi-access server;
receive, from a centralized device management server, a device management message transmitted by the centralized device management server for the IoT device;
virtually stage, based on the device management message and while the IoT device is offline, a configuration change that is to be performed on the IoT device; and
deliver, in response to communication from the IoT to indicate that the IoT device has come online and requests any device management messages that have been received, the device management message to the IoT device to direct the virtually staged configuration change to be performed on the IoT device.

19. The non-transitory computer-readable medium of claim 18, wherein the IoT device abstains from locally executing a localized device management client such that the virtualized device management client hosted on the multi-access server is configured to serve as the sole device management client for the IoT device.

20. The non-transitory computer-readable medium of claim 18, wherein the IoT device locally executes a localized device management client with which the virtualized device management client hosted on the multi-access server is configured to interoperate.

* * * * *